United States Patent Office 2,789,034
Patented Apr. 16, 1957

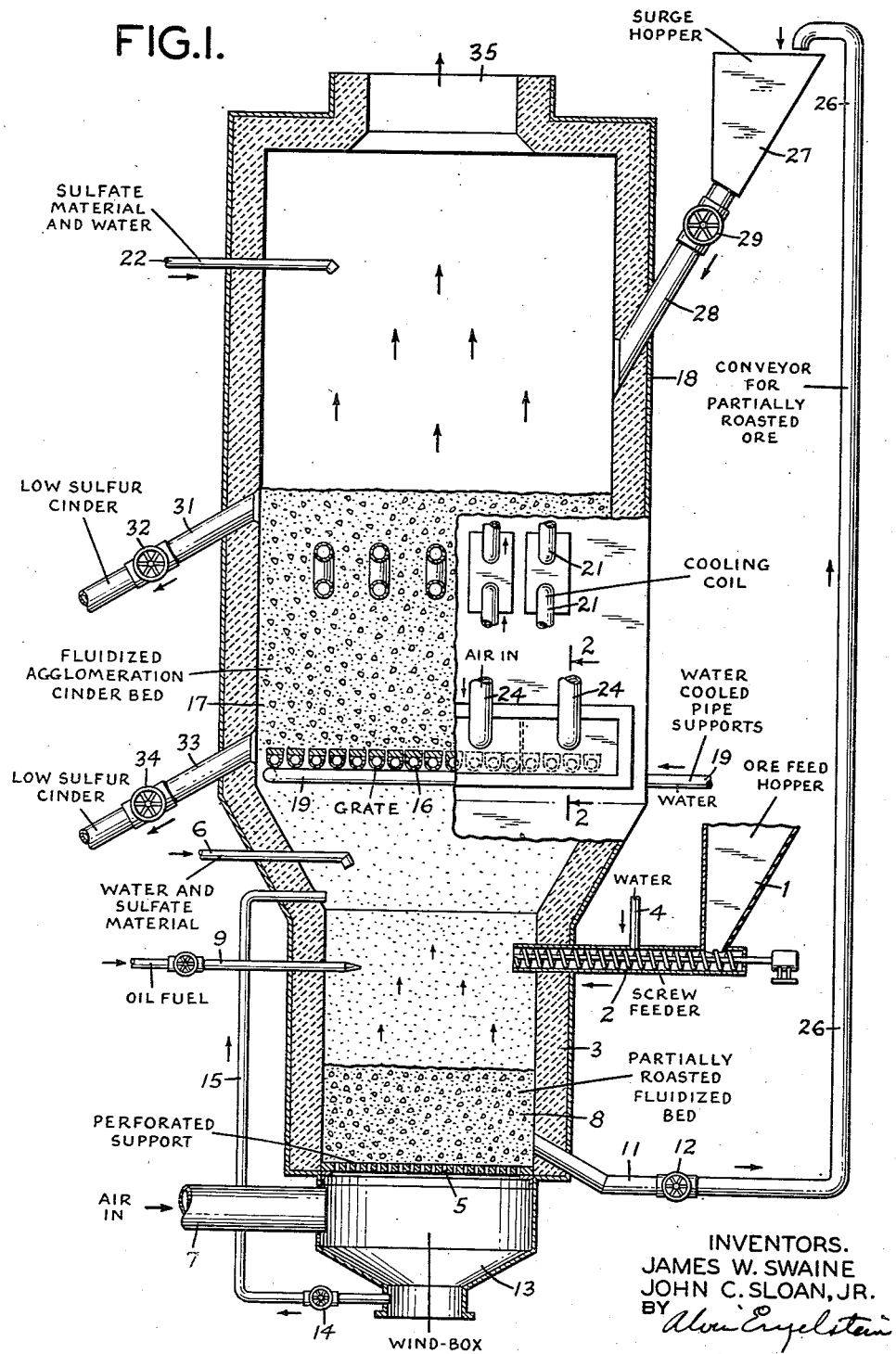

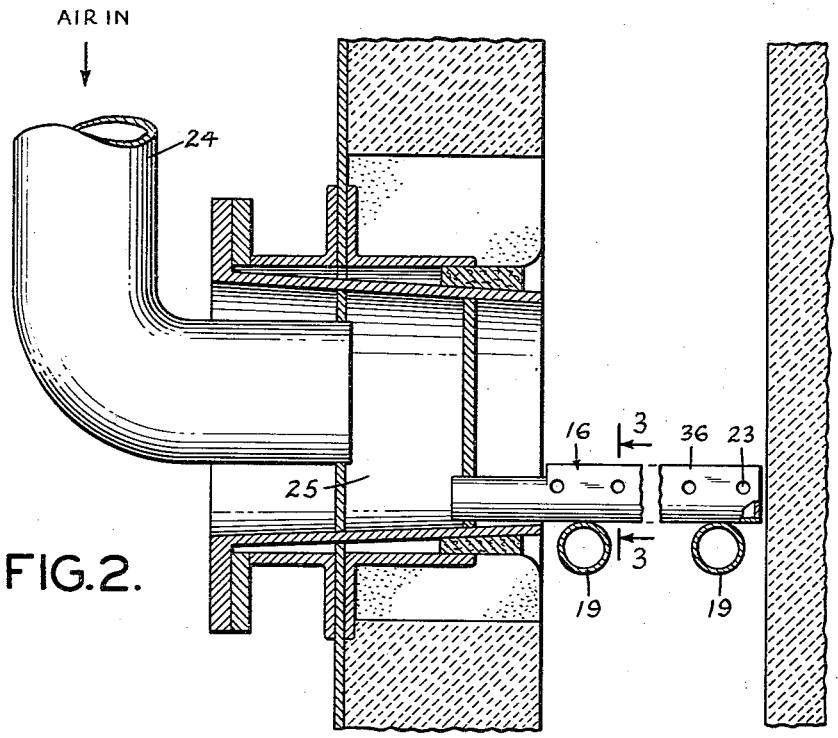
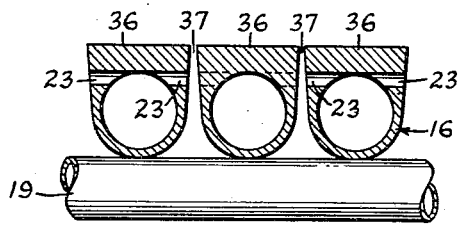

2,789,034

PROCESS AND APPARATUS FOR CONVERTING FINELY DIVIDED METAL SULFIDE ORE INTO SULFUR DIOXIDE AND AGGLOMERATES OF LOW SULFUR CINDER

James W. Swaine, Denville, and John C. Sloan, Jr., Neptune, N. J., assignors to Allied Chemical & Dye Corporation, New York, N. Y., a corporation of New York Application March 30, 1954, Serial No. 419,648

7 Claims. (Cl. 23—177)

This invention relates to a treatment of sulfide ore and more particularly refers to a new and improved process for converting metal sulfides into $SO_2$ gas and metal oxides.

There are two distinct methods in the art for roasting metallic sulfide ores, namely "the fluidized bed" and "suspension" roasting operations. The fluidized bed as well known in the art comprises a dense supported bed of solid particles with gas passing upwardly through the bed to cause the solid particles to become fluidized, i. e., behavior similar to a boiling liquid. Suspension roasting as recognized in the art involves roasting a dispersed suspension of very fine particles, less than about 40 mesh, while suspended in a gas. Each of these processes has definite limitations and disadvantages. One of the drawbacks in the fluidized bed roasting of iron sulfide ore is the production of a high sulfur cinder, roughly in excess of 1% total sulfur, which sulfur cinder has negligible sales value. Also when roasting finely divided concentrate in a fluidized bed there is excessive carryover of dust and incomplete roasting unless the capacity is markedly decreased resulting in increased cost of equipment and operation.

Suspension roasting involves roasting ore in finely divided state while in gaseous dispersed suspension in an oxidizing gas such as air. Suspension roasting is particularly adapted for the treatment of flotation concentrate which is a by-product from the milling in a mining operation and consists of pyrites or pyrrhotite of about 40 mesh down to 300 mesh or lower. The disadvantages of suspension roasting are several, including: relatively large suspension burner chambers are required in suspension roasting because the finely divided particles of ore are in a dispersed state suspended in the gas; the production of a finely divided cinder below about 40 mesh requires an additional sintering operation for metallurgical uses. The presence of large quantities of fine cinder dust in the sulfur dioxide gas from the suspension roaster requires elaborate and costly equipment for removal before conversion of the gas to sulfuric acid or for use in other processes.

The objects of the present invention are to provide improved methods and apparatus for roasting sulfur bearing ore, particularly fine flotation concentrates, to simultaneously produce sulfur dioxide gas and cinder product which is low in residual sulfur and considerably coarser in size than ore feed, and to reduce the amount of cinder fines in the sulfur dioxide exit gas stream to a minimum.

Other objects and advantages will be apparent from the following description and accompanying drawing.

The present invention is particularly concerned with roasting finely divided pyrites and pyrrhotite and similar ores containing a substantial percentage of particles which will pass through a 65 mesh screen. A large amount of this ore known as flotation concentrate is a by-product resulting from grinding performed as a step in the recovery of valuable metals, and indeed is quite often finer than actually necessary for efficient suspension roasting, e. g. up to 90% through 325 mesh. While some degree of fusion of cinder may occur during suspension roasting, for all practical purposes the size of cinder particles is not increased sufficiently to enhance its value as a raw material for metallurgical use. A cinder which has a low sulfur content and is of a particle size within the range of about −3 +35 mesh material is eminently satisfactory for most metallurgical purposes. Unfortunately the present commercial methods of roasting ores as previously explained will not economically produce cinder of the desired mesh size and low residual sulfur.

In the course of extensive investigation pertaining to the roasting of ores we noted and came to the following conclusions which will aid in the better understanding of the present invention.

(a) A bed of partially roasted sulfide ore can be maintained at a bulk bed temperature of 1600° F. without fusing or significant agglomeration. Fusion of particles occur above the softening temperature of the particles. Considerable agglomeration of cinder particles to form an agglomerate having interstices throughout its structure occurs when the temperature of the bed is maintained between 1750° and 1850° F. Agglomeration action is decreased considerably below a temperature of 1700° F.

The term "agglomeration" as used herein denotes the formation of a larger clump of particles from two or more smaller particles or clumps sticking together. The particles forming the agglomerate are more or less rounded and often contain interstices throughout its structure. This is contrasted to the term "fusion" wherein the particles are melted to form a solid non-porous mass.

(b) Agglomerates are desulfurized to the same extent as smaller individual particles, and to a greater extent than is the case if the initial size of the solid particle were equal to the size of the agglomerate, this due presumably to the open structure of agglomerate.

(c) The extent of agglomeration also depends upon fineness of ore particles undergoing roasting. Finer particles undergo considerably more agglomeration than do coarser.

(d) Hot, partially burned ore in semi-molten state will not stick to a cold surface, i. e. below about 1400° F. but more generally below about 1100° F., although it will stick to a hot surface.

(e) The softening temperature of low sulfur content cinder is in the range of 2300 to 2700° F. depending upon impurities present in the cinder. Cinder will not stick to a cinder in the fluidized bed when the particles in contact are below the softening temperature.

Taking into consideration the above factors we have after considerable experimentation developed a method for treating finely divided sulfide ores as exemplified by flotation concentrate to produce an $SO_2$ gas substantially free from cinder and a cinder product which is an agglomerate of the finely divided particles and has a sulfur content well below 1%.

In accordance with the present invention roasting of finely divided metal sulfide ore into sulfur dioxide and agglomerates of low sulfur cinder may be accomplished by maintaining a fluidized bed of partially roasted sulfide ore particles on a grate in a first zone, introducing finely divided metal sulfide ore into said fluidized bed at a rate sufficient to maintain a fluid bed in said first zone, passing a stream of oxygen-containing gas upwardly through the grate and fluidized bed at a velocity sufficiently high to maintain the solids in the bed in a fluidized state, regulating the rate of introduction of ore and oxygen-containing gas into the first zone to maintain therein a temperature in excess of about 1000° F. and below 1700° F., preferably within the range of 1550° F. to 1650° F. to effect partial roasting of the ore and to elutriate finely divided solids, preferably below 65 mesh, from the fluidized bed; discharging partially roasted ore from the first zone; introducing the partially roasted ore into a second zone, maintaining a second fluidized bed of agglomerated particles of low sulfur cinder supported on a grate inside the second zone at a temperature above about 1700° F. and below the softening point of the cinder, preferably within the range of about 1750° and 1850° F., discharging $SO_2$ containing gas with low oxygen content and having suspended therein finely divided particles of partially roasted ore generated in the first zone and passing said gas and suspended particles together with additional oxygen-containing gas through openings in a grate maintained at a relatively low temperature, desirably below 1400° F. and preferably below 1100° F., supporting the fluidized bed in the second zone at a velocity sufficiently high to maintain the solids in the second bed in a fluidized state, but at a velocity insufficient to elutriate therefrom any substantial portion of solids from the bed, to effect further roasting of the ore to produce additional $SO_2$ gas and a cinder containing less than about 1% sulfur, introducing said additional oxygen-containing gas into the $SO_2$ containing gas carrying suspended solids at a point between the bottom of the fluidized bed of cinder in the second zone and the top of the fluidized bed of partially roasted ore in the first zone, preferably in or adjacent the openings in the grate in the second zone, thereby causing said partially roasted suspended particles to oxidize and become plastic and acquire adhesive properties and attach themselves to like particles or to cinder to form agglomerates upon entering the second fluidized bed of cinder, discharging low sulfur cinder from the second zone, regulating the discharge of low sulfur cinder from the second zone and the introduction of partially roasted ore into the second zone so as to maintain the solids in the fluidized bed in the second zone substantially completely roasted cinder having a sulfur content below about 1%, and discharging $SO_2$ gas containing at most minor amounts of cinder from the second zone.

Referring to the drawing:

Figure 1 is a front elevation in partial section of one form of apparatus for carrying out the present invention.

Figure 2 is a side elevation taken on line 2—2 of Figure 1.

Figure 3 is on a larger scale, a section of the grate taken on line 3—3 of Figure 2.

Referring to the drawing, sulfur bearing ore such as iron pyrites or pyrrhotite or mixture of both, is introduced into feed hopper 1 and conveyed by pressure sealed screw 2 into roasting chamber 3. The ore may be finely divided particles consisting principally of a mesh size below 40 mesh such as flotation concentrate or may be a mixture of coarser particles, not exceeding about ½" diameter, and at least 25% finer particles having a size below 40 mesh. Small amounts of water may be added through line 4 to the ore conveyed by pressure sealed screw 2 to aid in maintaining the desired temperature in chamber 3 and facilitate maintaining the proper depth of ore in the bed of solids in chamber 3. A support 5 having small openings therein to permit passage of gas upwardly therethrough extends across chamber 3 at a point near the bottom for supporting a fluid bed of solids thereon. Such supports are conventional, commonly termed in the art "perforated plate," "screen," "hearth" and "grate." Since the temperature in chamber 3 is affected by minor changes in sulfur content of ore, ore feed rate, and air rate, automatically controlled addition of water through line 6 is used as, and if, necessary to maintain constant temperature in chamber 3. Decomposable waste sulfate material such as sulfate slurry, or spent alkylation acid sludge, may be available in which event the decomposable waste sulfate material may be introduced through line 6 into chamber 3 and excess heat generated in chamber 3 utilized to decompose the waste sulfate material into additional sulfur dioxide.

Into the bottom of chamber 3 through conduit 7 is introduced a stream of air passing upwardly through the openings in support 5 thence through a body of solids 8 resting on support 5 causing a portion of the oxidizable content of the ore in the fluidized bed 8 to react with the oxygen and to generate sufficient heat to raise the bulk temperature of the ore particles in the bed to a temperature in excess of 1000° F. The fluidizing and oxidizing gas, which may be any oxygen-containing gas, preferably air, should be at a sufficiently high velocity to maintain the body of solids 8 supported on grate 5 in a fluid state. Additional air can be added through conduit 7 to oxidize additional ore in an amount to generate sufficient excess heat to decompose sulfate slurry or spent alkylation acid sludge if these materials are available and introduced through line 6. The bulk bed temperature of the solids in chamber 3 is maintained below 1700° F., preferably below 1650° F. and desirably within the range of 1550–1650° F. The rate of oxidation is unduly prolonged at a temperature below 1000° F. and therefore it is preferable to maintain the temperature of the bed of solids in chamber 3 above 1200° F. to accelerate partial roasting of the ore in chamber 3.

To initiate the reaction in chamber 3 an oil burner 9 is provided disposed above the upper level of the bed of solids for preheating the unit from cold start-up. The unit may be started by first establishing a small flow of air entering through conduit 7 through the empty unit and heating with the oil burner 9 until the temperature is around 1000° F. Air flow will then be increased as necessary to fluidize an initial charge of cinder to both beds, the oil heating continued until the beds are above the ignition temperature of ore. Ore feed is then established at a low rate until the beds reach the desired conditions at which time the unit is brought up to capacity and placed on automatic control.

A portion of the bed of solids 8 supported on grate 5 is continuously or intermittently withdrawn through line 11 and any excess increase of bed depth in chamber 3 is prevented and depth is held constant by automatically controlled discharge valve 12. Complete oxidation of the ore in chamber 3 is not accomplished or desired. Oxidation of the ore in chamber 3 is carried to the extent of about 20–40%, based on complete oxidation of the ore. Siftage of material through grate 5 into windbox 13 beneath grate 5 may be returned through line 15 to chamber 3 by periodically opening valve 14. Since the pressure near the top of chamber 3 at the terminal end of line 15 is lower than the pressure in windbox 13, a quick opening of valve 14 will cause a blast of air carrying with it siftage to flow through line 15 into chamber 3 thereby avoiding the necessity of discharging the siftage from the system.

The hot, low oxygen content sulfur dioxide gas laden with suspended finely divided hot partially oxidized ore particles passes upwardly from the top of chamber 3 through grate 16 into fluidized agglomeration cinder bed 17 in roasting chamber 18. Roasting chamber 18 as is evident from the drawing is superimposed on chamber 3, being separated from the latter by means of grate 16 which rests on water cooled pipes 19. Cooling coil 21 embedded in cinder bed 17 and through which a cooling medium such as water flows removes the bulk of excess heat generated in chamber 18 as necessary to maintain the desired temperature in chamber 18. Additional sulfate slurry or spent alkylation acid sludge may be added to chamber 18 through line 22. Final control of the temperature in chamber 18 may be accomplished by automatically controlled addition of water through line 22.

In roasting chamber 18 is effected oxidation of partially roasted ore to a low sulfur cinder and concomitantly agglomeration of finely divided particles of the partially roasted ore to form cinder particles larger than the original feed material. To accomplish this result we have found it necessary to maintain certain specific operating conditions in chamber 18 as follows: The temperature of the fluidized bed of solids resting on grate 16 must be maintained below the softening temperature of the fluidized solids, desirably below about 2000-2100° F., preferably within the range of 1750-1850° F. for the reason that at temperatures below 1700° F. agglomeration will not occur and at temperatures above the softening point the partially oxidized ore will fuse and form large clumps of solid particles which are difficult to completely oxidize and maintain in a fluid state. Stated another way, the partially oxidized sulfide ore is a non-coherent solid at temperatures below 1700° F. and a fusible solid above the softening temperature of the cinder. Within the range of 1700-1950° F. the partially oxidized ore is a semi-solid which readily agglomerates without fusion. Thus the necessity of maintaining the temperature within the limited range will be evident. However, when maintaining a fluidized bed of partially roasted ore in a conventional manner at a temperature above 1700° F. we found the finely divided particles of ore in their semi-solid or plastic state tended to stick to the grate causing serious difficulties in operation. We discovered that if the grate were maintained at a low temperature at least 200 degrees lower than the body of ore resting on it, preferably below 1400° F. and desirably below 1100° F., then the tendency of the ore particles to stick to the grate disappears. To maintain grate 16 at a low temperature, we have constructed grate 16 of a series of hollow spaced parallel tubes shown in greater detail in Figures 2 and 3 with each tube provided with a plurality of openings 23 along the side of the tube for the discharge of air which enters through line 24 and windbox 25. The air flowing through grate 16 thus cools the grate and also aids in maintaining the bed of solids 17 supported by grate 16 in a fluid condition and also effects substantially complete roasting of the solids. One of the important things in the operation is to control the degree of agglomeration of the partially burned sulfide ore, that is, the size of the ore which for purposes of metallurgical use should desirably be no smaller than within the range of —3 +35 mesh material. If the bed of solids 17 were composed in large part or entirely of partially burned ore, agglomeration of the particles would occur rapidly into clumps of size such as to interfere with fluidization of the bed, eventually leading to loss of fluidization action. Cinder particles which have a sulfur content below about 1%, have a softening point in the range of about 2300° F. and 2700° F. depending upon impurities present in the cinder, and will not stick to other cinder particles in a fluidized bed below the softening temperature. Thus, under the conditions of operation, i. e. below the softening temperature, the cinder particles will not agglomerate. We take advantage of this property of the cinder and employ the cinder as a means of regulating and preventing the formation of unduly large size agglomerates of partially roasted ore by maintaining in the fluidized bed 17 above grate 16 a large proportion of low sulfur cinder in excess of 90%, preferably in excess of 95%. In practice we have found it desirable to maintain about 98-99+% cinder and less than 1-2% partially roasted ore in bed 17. To accomplish this purpose, at the start of the operation a bed composed only of cinder is first disposed above grate 16 and as the operation proceeds partially roasted ore is gradually added to the bed of cinder and the desired proportion of cinder and partially roasted ore in the bed of solids is maintained by regulating the rate of introduction of ore and the rate of withdrawal of cinder from the bed. The partially roasted ore discharging from chamber 3 through line 11 and valve 12 is conveyed by means of elevator 26 which may be a conventional heat-resistant sealed bucket elevator or other suitable conveyer to surge hopper 27 down through line 28 and sealed valve 29 into agglomerating chamber 18, falling into agglomerating bed of fluid solids 17 disposed above grate 16 wherein oxidation is completed. Desulfurized agglomerates are removed through line 31 and automatically controlled discharge valve 32 and line 33 and valve 34 in an amount necessary to maintain constant any desired depth of agglomerating bed. Discharged cinder, that is, cinder having a sulfur content below 1%, is about a —3 +35 mesh material and is in the form of a rounded agglomerate having interstices throughout its structure and as such suitable for metallurgical purposes.

The hot, low oxygen content sulfur dioxide gas at a temperature in excess of 1000° F. containing hot partially oxidized suspended ore particles together with additional air entering through line 24 in an amount somewhat in excess of that theoretically necessary to oxidize the contents of agglomerating chamber 18 passes upwardly through grate 16, thence through the bed of fluidized solids 17 supported on the grate. This air flows at high velocity through the conduit sections which make up grate 16, to maintain the grate desirably below a temperature of about 1100° F. thus avoiding excessive mechanical stresses and precluding any tendency for burning ore to stick to the grate. Conduits 36 as shown in Figure 3 provide openings 37 about ⅛ to ¼" wide for the passage of gas and finely divided ore particles through grate 16 into bed 17. The air preheated by passage through grate 16 discharges through outlets 23 mixing intimately with the partially oxidized ore particles carried upwardly by the gases leaving the top of chamber 3 and the mixture passes into the fluidized cinder bed 17. Reaction occurs almost immediately, with the ore particles reaching their plastic temperature, thus permitting the formation of agglomerates by collision of burning particles with like particles or with cinder particles. The effluent sulfur dioxide-containing gas discharges from the top of chamber 18 through opening 35 to a boiler, not shown in the drawing, for recovery of heat. The dust loading of the effluent gas is very low compared to suspension roasting loading as the fluidized agglomerator bed in chamber 18 reduces the weight of —35 mesh particles, approximately the maximum size that the gas will carry to a low percentage less than 10% and usually less than 5% of the weight fed. Erosion and resulting maintenance of the boiler is thus reduced and purification of the sulfur containing gas before further processing is greatly simplified.

The fluidized agglomerator system described herein permits roasting of finely ground sulfur bearing ores, either wet or dry, and production of cinder product low in residual sulfur and considerably coarser in size than now realized from suspension roasting. Also the fluidized agglomerator permits the use of a considerably coarser ore fraction than can be handled by suspension roasting. This is of particular value in cases where the ore is mined and beneficiated solely for its sulfur content, in which case fine grinding is often unnecessary insofar as beneficiation is concerned. The fines contained in the coarse ores would be agglomerated resulting in substantially 100% recovery of cinder as a —3 +35 mesh material. The process of the present invention accomplishes agglomeration of finely divided ore particles by deliberately increasing the possibilities for causing hot, semi-solid particles undergoing oxidation to collide and adhere to each other or to hot, solid oxidized cinder particles. The agglomerated particle has well defined interstices such that oxidation of the agglomerate goes to completion after formation. The maximum size of agglomerated particle that will be formed is limited by utilizing the diluting effect of the bed of cinder. This diluting effect prevents formation of agglomerates of such size that the fluidizing action of the bed would be lost resulting in eventual fusion of the entire bed. Rapid and complete intermingling of hot, partially burned ore with the necessary quantity of additional oxygen required for complete oxidation with the mixture of ore and air evenly distributed across the bottom place of the fluidized bed assures complete utilization of the reaction volume of the bed and results in a much higher unit capacity.

The following example illustrates one method of carrying out the invention.

A charge of raw untreated pyrrhotite ore containing 2% moisture, a sulfur content 35% and a particle size distribution of 0% of +10 mesh; 1.4% of +65 mesh; 1.9 of +100 mesh; 15.6% of +200 mesh; and 81.1% of —200 mesh is introduced into chamber 3 as illustrated in the drawing at the rate of five tons of ore per hour. The partial roasting chamber 3 and agglomerating chamber 18 superimposed thereon are lined with insulating brick and refractory brick. The partial roasting chamber is 5′ 4″ x 5′ 4″ inside and the agglomerating chamber is 8′ 10″ x 8′ 10″ inside with an overall height of 30′. The cross sectional area of the partial roasting grate 5 is 28 square feet and the cross sectional area of the agglomeration grate 16 is 78 square feet. The depth of the partial roasting bed 8 (at rest) is 20″ and the depth of the agglomeration bed 17 (at rest) is 40″. Air at the rate of 1600 cubic feet per minute is introduced into the partial roasting chamber which is maintained at a temperature of 1625° F. by the addition of 125 gallons per hour sulfate slurry and 15 gallons per hour water. Partially roasted ore is continuously withdrawn from the bed and conveyed via an elevator to agglomerating chamber 18.

The sulfur dioxide gas generated in chamber 3 contains 13.5% $SO_2$ and passes upwardly through grate 16 into the agglomerating bed of solids maintained at a temperature of 1775° F. in chamber 18. 4800 cubic feet per minute of air are passed through the hollow tubes of grate 16 discharging from the openings 23 in the sides of the tubes, thence upwardly through the agglomerating bed of solids. 180 gallons per hour sulfate slurry and 24 gallons of water per hour are added to the bed for control of temperature, and product cinder containing 0.5% sulfur is withdrawn from the agglomeration bed. The gases discharging from the top of the agglomeration bed contain 10% sulfur dioxide and carry with them cinder dust at the rate of 0.2 ton per hour. Thus the amount of dust product is less than 5% of the total amount of cinder produced in the system. The following table shows the increase in particle size of the cinder as compared with the ore feed as well as the particle size of the dust, and in addition the relative quantities of each.

| Mesh | +10 | 10/65 | 65/100 | 100/200 | —200 | Tons Per Hour |
|---|---|---|---|---|---|---|
| Ore | 0 | 1.4 | 1.9 | 15.6 | 81.1 | 5 |
| Cinder | 25.6 | 71.3 | 1.4 | .8 | .9 | 4.2 |
| Dust | 0 | 20.5 | 28.5 | 24.7 | 26.6 | 0.2 |

Although certain preferred embodiments of the invention have been disclosed for purpose of illustration it will be evident that various changes and modifications may be made therein without departing from the scope and spirit of the invention.

We claim:

1. A process for converting finely divided metal sulfide ore into sulfur dioxide and agglomerates of low sulfur cinder, which comprises maintaining a fluidized bed of finely divided sulfide ore particles on a grate in a first zone, introducing finely divided metal sulfide ore into said fluidized bed at a rate sufficient to maintain a fluid bed in said first zone, passing a stream of oxygen-containing gas upwardly through said grate and fluid bed at a velocity sufficiently high to maintain the solids in said bed in a fluidized state, regulating the rate of introduction of ore and oxygen-containing gas into the first zone to maintain therein a temperature in excess of 1000° F. and below 1700° F. to effect partial roasting of the ore and to elutriate finely divided solids from the fluidized bed, maintaining a second fluidized bed of agglomerated particles of low sulfur cinder supported on a grate in a second zone at a temperature above about 1700° F. and below the softening point of the cinder, maintaining said grate in the second zone at a relatively low temperature below about 1400° F. to prevent ore from adhering to said grate, discharging hot $SO_2$ containing gas at a temperature in excess of 1000° F. having suspended therein finely divided particles of partially roasted ore generated in the first zone and passing said hot gas and suspended particles together with additional oxygen-containing gas through openings in said grate supporting the fluidized cinder bed in the second zone at a velocity sufficiently high to maintain the solids in the second bed in a fluidized state, but at a velocity insufficient to elutriate therefrom any substantial portion of solids from the bed, to effect further roasting of the ore to produce additional $SO_2$ gas and a cinder containing less than about 1% sulfur, introducing said additional oxygen-containing gas into the $SO_2$ containing gas carrying suspended solids at a point between the bottom of the fluidized bed of cinder in the second zone and the top of the fluidized bed of partially roasted ore in the first zone to cause said partially roasted suspended particles to become plastic and to acquire adhesive properties and to attach themselves to other particles to form agglomerates upon entering the second fluidized bed of cinder, discharging low sulfur cinder from the second zone, regulating the discharge of low sulfur cinder from the second zone and the introduction of partially roasted ore into the second zone so as to maintain the solids in the fluidized bed in the second zone in excess of 90% low sulfur cinder, i. e. substantially completely roasted cinder having a sulfur content below about 1%, and discharging $SO_2$ gas containing at most minor amounts of cinder from the second zone.

2. A process for converting finely divided iron sulfide ore into sulfur dioxide and agglomerates of low sulfur cinder, which comprises maintaining a fluidized bed of finely divided sulfide ore particles on a grate in a first zone, introducing finely divided iron sulfide ore into said fluidized bed at a rate sufficient to maintain a fluid bed in said first zone, passing a stream of oxygen-containing gas upwardly through said grate and fluid bed at a velocity sufficiently high to maintain the solids in said bed in a fluidized state, regulating the rate of introduction of ore and oxygen-containing gas into the first zone to maintain therein a temperature within the range of 1550–1650° F. to effect partial roasting of the ore and to elutriate finely divided solids below about 65 mesh from the fluidized bed, maintaining a second fluidized bed of agglomerated particles of low sulfur cinder supported on a grate in a second zone at a temperature within the range of 1750–1850° F., maintaining said grate in the second zone at a relatively low temperature below about 1100° F. to prevent ore from adhering to said grate, discharging hot $SO_2$ containing gas at a temperature in excess of 1000° F. having suspended therein finely divided particles of partially roasted ore generated in the first zone and passing said hot gas and suspended particles together with additional oxygen-containing gas through openings in said grate supporting the fluidized cinder bed in the second zone at a velocity sufficiently high to maintain the solids in the second bed in a fluidized state, but at a velocity insufficient to elutriate therefrom any substantial portion of solids from the bed, to effect further roasting of the ore to produce additional $SO_2$ gas and a cinder containing less than about 1% sulfur, introducing said additional oxygen-containing gas into the $SO_2$ containing gas carrying suspended solids at a point beneath and adjacent the bottom of the fluidized bed of cinder in the second zone to cause said partially roasted suspended particles to become plastic and to acquire adhesive properties and to attach themselves to other particles to form agglomerates upon entering the second fluidized bed of cinder, discharging low sulfur cinder from the second zone, regulating the discharge of low sulfur cinder from the second zone and the introduction of partially roasted ore into the second zone so as to maintain the solids in the fluidized bed in the second zone in excess of 95% low sulfur cinder, i. e. substantially completely roasted cinder having a sulfur content below about 1%, and discharging $SO_2$ gas containing at most minor amounts of cinder from the second zone.

3. A process for converting finely divided metal sulfide ore into sulfur dioxide and agglomerates of low sulfur cinder, which comprises maintaining a fluidized bed of finely divided sulfide ore particles on a grate in a first zone, introducing finely divided metal sulfide ore into said fluidized bed at a rate sufficient to maintain a fluid bed in said first zone, passing a stream of oxygen-containing gas upwardly through said grate and fluid bed at a velocity sufficiently high to maintain the solids in said bed in a fluidized state, regulating the rate of introduction of ore and oxygen-containing gas into the first zone to maintain therein a temperature in excess of 1000° F. and below 1700° F. to effect partial roasting of the ore and to elutriate finely divided solids from the fluidized bed, maintaining a second fluidized bed of agglomerated particles of low sulfur cinder supported on a grate in a second zone at a temperature above about 1700° F. and below about 2000° F., maintaining said grate in the second zone at a relatively low temperature below about 1400° F. to prevent ore from adhering to said grate, discharging hot $SO_2$ containing gas at a temperature in excess of 1000° F. having suspended therein finely divided particles of partially roasted ore generated in the first zone and passing said hot gas and suspended particles together with additional oxygen-containing gas through openings in said grate supporting the fluidized cinder bed in the second zone at a velocity sufficiently high to maintain the solids in the second bed in a fluidized state, but at a velocity insufficient to elutriate therefrom any substantial portion of solids from the bed, to effect further roasting of the ore to produce additional $SO_2$ gas and a cinder containing less than about 1% sulfur, introducing said additional oxygen-containing gas into said grate in the second zone provided with internal ducts and passing said oxygen-containing gas through the ducts to maintain the grate at a low temperature, discharging the oxygen-containing gas from the ducts in said grate at a point immediately below and adjacent the bottom of the fluidized bed supported by said grate into the uprising stream of hot $SO_2$ gas containing suspended partially roasted particles from the first zone to cause said partially roasted suspended particles to become plastic and to acquire adhesive properties and to attach themselves to other particles to form agglomerates upon entering the second fluidized bed of cinder, discharging low sulfur cinder from the second zone, regulating the discharge of low sulfur cinder from the second zone and the introduction of partially roasted ore into the second zone so as to maintain the solids in the fluidized bed in the second zone in excess of 95% low sulfur cinder, i. e. substantially completely roasted cinder having a sulfur content below about 1%, and discharging $SO_2$ gas containing at most minor amounts of cinder from the second zone.

4. A process for converting finely divided iron sulfide ore into sulfur dioxide and agglomerates of low sulfur cinder, which comprises maintaining a fluidized bed of finely divided sulfide ore particles on a grate in a first zone, introducing finely divided iron sulfide ore into said fluidized bed at a rate sufficient to maintain a fluid bed in said first zone, passing a stream of oxygen-containing gas upwardly through said grate and fluid bed at a velocity sufficiently high to maintain the solids in said bed in a fluidized state, regulating the rate of introduction of ore and oxygen-containing gas into the first zone to maintain therein a temperature within the range of 1550–1650° F. to effect partial roasting of the ore and to elutriate finely divided solids below about 65 mesh from the fluidized bed, discharging the partially roasted ore from the first zone, introducing the partially roasted ore into a second zone, maintaining a second fluidized bed of agglomerated particles of low sulfur cinder supported on a grate in a second zone at a temperature within the range of 1750–1850° F., maintaining said grate in the second zone at a relatively low temperature below about 1100° F. to prevent ore from adhering to said grate, discharging hot $SO_2$ containing gas at a temperature in excess of 1000° F. having suspended therein finely divided particles of partially roasted ore generated in the first zone and passing said hot gas and suspended particles together with additional oxygen-containing gas through openings in said grate supporting the fluidized cinder bed in the second zone at a velocity sufficiently high to maintain the solids in the second bed in a fluidized state, but at a velocity insufficient to elutriate therefrom any substantial portion of solids from the bed, to effect further roasting of the ore to produce additional $SO_2$ gas and a cinder containing less than about 1% sulfur, introducing said additional oxygen-containing gas into said grate in the second zone to effect further roasting of the ore to produce additional $SO_2$ gas and a cinder containing less than about 1% sulfur, introducing said additional oxygen-containing gas into said grate in the second zone provided with internal ducts and passing said oxygen-containing gas through the ducts to maintain the grate at the low temperature, discharging the oxygen-containing gas from the ducts in said grate at a point immediately below and adjacent the bottom of the fluidized bed supported by said grate into the uprising stream of hot $SO_2$ gas containing suspended partially roasted particles from the first zone to cause said partially roasted suspended particles to become plastic and to acquire adhesive properties and to attach themselves to other particles to form agglomerates upon entering the second fluidized bed of cinder, discharging low sulfur cinder from the second zone, regulating the discharge of low sulfur cinder from the second zone and the introduction of partially roasted ore into the second zone so as to maintain the solids in the fluidized bed in the second zone in excess of 95% low sulfur cinder, i. e. substantially completely roasted cinder having a sulfur content below about 1%, and discharging $SO_2$ gas containing at most minor amounts of cinder from the second zone.

5. A process for converting finely divided metal sulfide ore into sulfur dioxide and agglomerates of low sulfur cinder which comprises maintaining a fluidized bed of agglomerated particles of low sulfur cinder supported on a grate at a temperature above about 1700° F. and below the softening temperature of the cinder, maintaining said grate at an appreciably lower temperature below about 1400° F. to prevent ore from adhering to said grate, passing a stream of hot gas containing suspended particles of sulfide ore together with additional oxygen-containing gas through openings in said grate supporting the fluidized cinder bed at a velocity sufficiently high to maintain the solids in the bed in a fluidized state, but at a velocity insufficient to elutriate therefrom any substantial portion of solids from the bed, to effect substantially complete roasting of the ore to produce $SO_2$ gas and a low sulfur cinder, introducing said additional oxygen-containing gas into the gas carrying suspended solids at a point below the bottom of the fluidized bed of cinder to cause the suspended particles to become plastic and to acquire adhesive properties and to attach themselves to other particles to form agglomerates upon entering the fluidized bed of cinder, discharging low sulfur cinder from the fluidized bed of cinder, regulating the discharge of low sulfur cinder from the fluidized bed and the introduction of ore into the fluidized bed so as to maintain solids in the fluidized bed in excess of 90% low sulfur cinder, and discharging SO$_2$ gas containing at most minor amounts of cinder from the top of the fluidized bed.

6. A process for converting finely divided iron sulfide ore into sulfur dioxide and agglomerates of low sulfur cinder which comprises maintaining a fluidized bed of agglomerated particles of low sulfur cinder supported on a grate at a temperature within the range of 1750–1850° F., maintaining said grate at an appreciably lower temperature below about 1100° F. to prevent ore from adhering to said grate, passing a stream of hot gas containing suspended particles of ore below about 65 mesh together with additional oxygen-containing gas through openings in said grate supporting the fluidized cinder bed at a velocity sufficiently high to maintain the solids in the bed in a fluidized state, but at a velocity insufficient to elutriate therefrom any substantial portion of solids from the bed, to effect substantially complete roasting of the ore to produce SO$_2$ gas and a cinder containing less than about 1% sulfur, introducing said additional oxygen-containing gas into said grate provided with internal ducts and passing said oxygen-containing gas through the ducts to maintain the grate at a low temperature, discharging the oxygen-containing gas from the ducts in said grate at a point immediately below and adjacent the bottom of the fluidized bed supported by said grate into the uprising stream of hot SO$_2$ gas containing suspended finely divided particles of ore to cause said suspended particles to become plastic and to acquire adhesive properties and to attach themselves to other particles to form agglomerates upon entering the fluidized bed of cinder, discharging low sulfur cinder from the fluidized bed of cinder, regulating the discharge of low sulfur cinder from the fluidized bed and the introduction of ore in the fluidized bed so as to maintain solids in the fluidized bed in excess of 95% low sulfur cinder, i. e. substantially completely roasted cinder having a sulfur content below about 1%, and discharging SO$_2$ gas containing at most minor amounts of cinder from the top of the fluidized bed.

7. Apparatus for effecting roasting and agglomeration of finely divided metallic sulfide ores which comprises in combination, a first fluidization chamber, a perforated plate in the bottom of the fluidization chamber adapted to support a fluidized bed of solids, an ore feed inlet into the fluidized chamber above the perforated plate, an inlet into the fluidization chamber below the perforated plate for the introduction of oxygen-containing gas to maintain a bed of solids therein in a fluid state and to effect partial roasting of the ore in said bed of solids and to elutriate finely divided particles from the fluidized bed of solids, an opening in the upper portion of said fluidization chamber to permit discharge therefrom of gas and finely divided suspended solid particles, a second fluidization chamber disposed above the first fluidization chamber, a grate in the bottom of the second fluidization chamber adapted to support a fluidized bed of cinder, said grate having internal ducts for the passage of cooling gas therethrough to maintain the grate at a low temperature, said grate being further provided with a plurality of openings for the discharge of the cooling gas adjacent the top of said grate into the stream of gas containing suspended particles from the first fluidization chamber, an outlet for the discharge of solids from the fluidized bed of solids in the second fluidization chamber, an outlet near the top of the second fluidization chamber for the discharge therefrom of SO$_2$ containing gas, and valved conduit means connecting the bottom of the first fluidization chamber with the top of the first fluidization chamber for the return of material sifting through the perforated plate to the top of the first fluidization chamber.

References Cited in the file of this patent

UNITED STATES PATENTS

| | | |
|---|---|---|
| 2,536,099 | Schleicher | Jan. 2, 1951 |
| 2,591,595 | Ogorzaly | Apr. 1, 1952 |
| 2,620,262 | Hujsak | Dec. 2, 1952 |
| 2,637,629 | Lewis | May 5, 1953 |

FOREIGN PATENTS

| | | |
|---|---|---|
| 150,454 | Great Britain | Sept. 9, 1920 |